United States Patent [19]

Rusk

[11] 3,814,981

[45] June 4, 1974

[54] HORIZONTAL CENTERING CIRCUIT

[75] Inventor: George R. Rusk, Forest Park, Ill.

[73] Assignee: Warwick Electronics Inc., Chicago, Ill.

[22] Filed: Jan. 29, 1973

[21] Appl. No.: 327,576

[52] U.S. Cl. .......... 315/27 TD

[51] Int. Cl. .......... H01j 29/70

[58] Field of Search ....... 315/27 TD, 27 SR, 28, 29, 315/27 R

[56] References Cited

UNITED STATES PATENTS

| | | | |
|---|---|---|---|
| 3,395,311 | 7/1968 | Hursh | 315/29 |
| 3,489,948 | 1/1970 | Buechel | 315/27 TD |
| 3,733,513 | 5/1973 | Yoshikawa et al. | 315/27 TD |

*Primary Examiner*—T. H. Tubbesing
*Assistant Examiner*—J. M. Potenza
*Attorney, Agent, or Firm*—Hofgren, Wegner, Allen, Stellman & McCord

[57] ABSTRACT

A horizontal centering circuit having a variable differential coil with its center tap coupled to the junction between a horizontal deflection winding and an S-shaping capacitor and its outer ends coupled to a B+ voltage supply through oppositely poled diodes and which conducts a selected amount of current from the B+ voltage supply to or from the capacitor when the voltage thereacross is different from the B+ supply voltage. The horizontal centering current provides a selected DC offset current through a deflection coil for centering an electron beam on the screen of a cathode ray tube.

9 Claims, 2 Drawing Figures

PATENTED JUN 4 1974

3,814,981

HORIZONTAL CENTERING CIRCUIT

BACKGROUND OF THE INVENTION

This invention relates generally to a horizontal centering circuit for introducing a selected constant DC component into the horizontal deflection winding current in a cathode ray tube and, in particular, to such a circuit adapted for use in solid state television receivers or display devices.

A cathode ray tube used in a standard television receiver or display system includes a horizontal deflection winding to which is applied a sawtooth current for deflecting an electron beam to form a raster on the screen of the tube. Due to various causes, such as inaccuracies in tube construction and the presence of natural and other magnetic fields, the raster produced on the screen is off-center when the sweep or sawtooth signal applied to the deflection windings has a zero DC value. In order to center the raster on the screen in those situations, a DC component must be added to the deflection winding current. Since many of the causes for off-center raster vary with location and time, the circuit for centering the raster must be capable of producing a DC offset current which is readily adjustable with respect to its magnitude. Further, since the raster may be off center in either direction, the offset current must be readily adjustable with respect to its polarity.

Known horizontal centering circuits typically fall into two general classes: those which are connected in series with the deflection coil or yoke and develop a DC offset by partial rectification of the deflection winding current, and those which include a separate DC power supply which is connected in parallel with the deflection coil. The use of a separate DC power supply is expensive, and in solid state receivers the use of a series centering circuit requires expensive components due to the high deflection currents found in such receivers. Other known circuits develop a centering current from existing sources or signals commonly found in receivers, require the utilization of resistance means for introducing the centering current to the deflection windings which renders them impractical due to the high currents involved.

SUMMARY OF THE INVENTION

The circuit of the present invention overcomes many of the aforementioned problems of the prior art. It utilizes a waveform already present in the horizontal deflection circuit to develop a DC offset current component for the deflection winding, and it is not in series with the deflection winding and thus need not handle the entire deflection winding current. Further, reactive impedance means are utilized to couple the DC offset signals to the deflection windings, the low power dissipation characteristics of which, as opposed to resistors, enables the generation of relatively high centering currents without the need for high power components or heat sinking apparatus.

Thus, a principal object of the present invention is the provision of a deflection centering circuit capable of generating relatively high centering currents such as are required by the deflection windings presently used in large screen, solid state television receivers and the like, without the need for expensive, high-powered components or heat sinking apparatus.

Another object of the present invention is the provision of a simple centering circuit which does not rely on any peculiarities of a particular deflection circuit but, rather, operates on wave forms present in substantially all horizontal deflection circuits such that it may be readily utilized therewith without necessitating extensive design changes.

A further object of the present invention is the provision of a centering circuit in which two parallel circuits coupled between a source of reference potential and the junction between the deflection winding and an S-shaping capacitor, each parallel circuit having a variable inductor and an oppositely poled diode, and each parallel circuit alternately providing a DC offset current component for the deflection winding during corresponding alternate portions of the voltage across the S-shaping capacitor.

Yet another object of the present invention is the provision of a centering circuit in which the S-shaping capacitor of the deflection circuit together with the filter capacitance associated with the source of reference potential provides sufficient filtering to produce a constant DC current offset in the deflection winding despite the periodic nature of current through the centering circuit.

BRIEF DESCRIPTION OF THE DRAWINGS

Further features and advantages of Applicant's invention are made apparent in the detailed description of the preferred embodiment taken in conjunction with the drawings, in which.

DESCRIPTION OF THE PREFERRED EMBODIMENT

Figure 1:
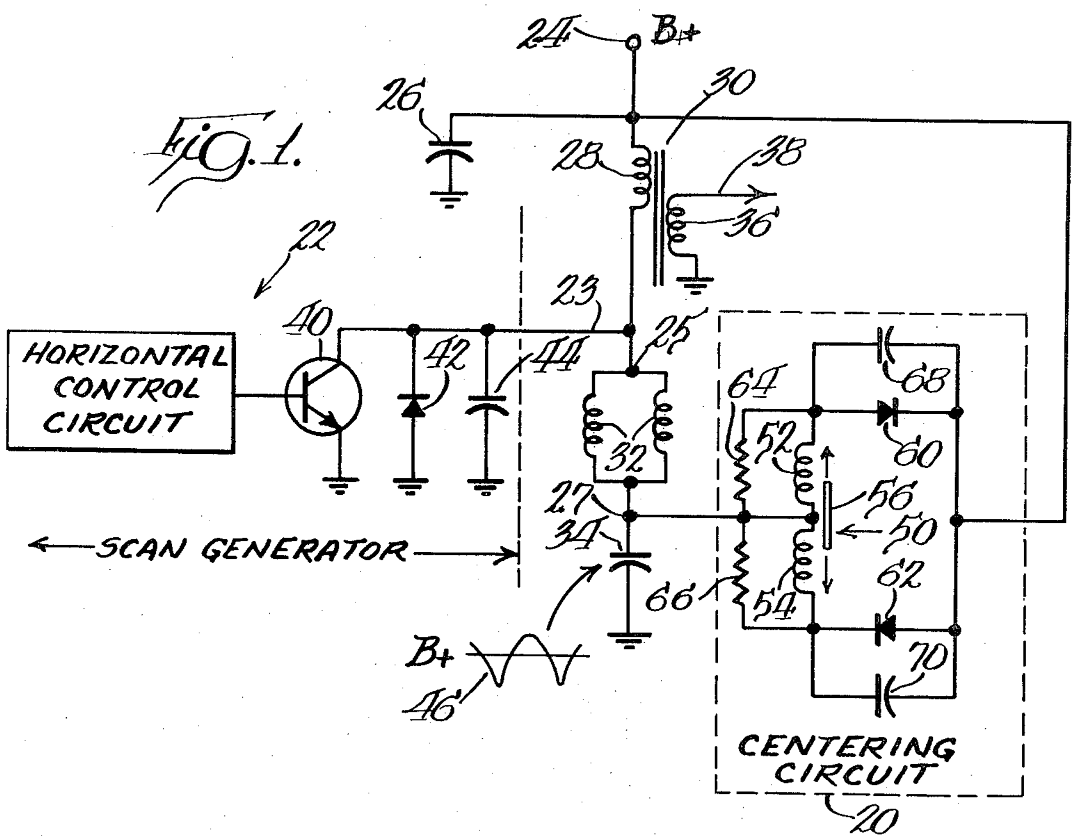
FIG. 1 is a schematic diagram of the centering circuit coupled with a typical solid state horizontal deflection circuit.

Referring to FIG. 1, a preferred embodiment of the centering circuit 20 is shown in the environment of a typical horizontal deflection circuit having a scan signal generator, generally designated by reference numeral 22 with its output 23 coupled to one side 25 of a pair of parallel connected deflection windings 32 for producing a sawtooth current therethrough. A source of B+ reference potential is coupled through a primary winding 28 of a fly-back transformer 30 to one side 25 of deflection windings 32 which are disposed at the yoke of a cathode ray tube (not shown). The other side of deflection windings 32 is coupled at junction 27 to a suitable S-shaping capacitor 34, the other side of which is coupled to ground. A secondary or high voltage winding 36 of fly-back transformer 30 provides the necessary high voltage signal on its output 38 during the retrace portion of the scan or deflection current.

Scan generator 22 comprises a horizontal control circuit of suitable construction for producing a pulsating signal of proper frequency and duration to control switching transistor 40 for imparting a suitable sawtooth or sweep current through deflection coils 32 in a well known manner. A diode 42 coupled between the collector of horizontal output transistor 40 and ground is provided to provide a portion of the scan trace by conducting current from the flyback transformer after the termination of retrace and prior to conduction of transistor 40. A flyback tuning capacitor 44 coupled between the collector of transistor 40 and ground provides a discharge path for the energy stored in deflection windings 32 during the trace portion of the sawtooth current to form the retrace portion when transistor 40 turns off.

The centering circuit 20 is coupled between B+ reference potential 24 and junction 27 between deflection windings 32 and S-shaping capacitor 34. Nearly all of the deflection current passes through the S-shaping capacitor 34 to ground to produce a voltage thereacross having a parabolic wave form with first and second portions respectively varying above and below B+ reference potential. The average voltage across capacitor 34 is equal to the B+ reference potential. A small component of the deflection current passes through centering circuit 20 between the B+ reference potential, which represents an AC ground and junction 27 during the different portions of the parabolic voltage signal across S-shaping capacitor 34. The current flowing through the centering circuit 20 is sawtooth in nature, as is the deflection current itself, but the current through the centering circuit contains a DC component which may be positive or negative depending upon the setting of variable differential coil, generally designated by reference numeral 50.

Variable differential coil 50 has a pair of reactive impedance elements or inductance coils 52 and 54 wound on a common bobbin and having a single ferrite core manually adjustable between the two coils such that the inductance of either coil may be made several times greater than that of the other coil. Since a common core 56 is utilized for both coils, variation of impedance due to movement of the core of one of the coils 52 and 54 is inversely related to the variation of impedance of the other coil. This common core configuration facilitates variation of the ratio of the reactive impedance of one coil element to that of the other with minimum adjustment. It should be appreciated, however, that coils 52 and 54 could each be provided with a separate adjustable core.

Coils 52 and 54 are coupled together at one end to junction 27 between deflection windings 32 and S-shaping capacitor 34. The other end of coil 52 is coupled through a diode 60 to B+ reference potential, and, similarly, the other end of coil 54 is coupled through a diode 62 of opposite polarity to that of diode 60 to B+ reference potential. Resistors 64 and 66, respectively coupled across coils 52 and 54, are provided to prevent ringing within the circuit, and capacitors 68 and 70, respectively coupled across diodes 60 and 62, are employed as high frequency filters and to increase the conduction time of their associated diodes.

When the parabolic voltage signal across capacitor 34 is greater than the B+ reference potential, diode 62 is reverse biased to block current and diode 60 is forward biased to conduct current from junction 27 through reactive impedance element 52, and diode 60 to B+ reference potential 24. Similarly, during the period or portion of the parabolic voltage signal across capacitor 34 below B+ reference potential, current through coil element 52 will be blocked by diode 60 and will be conducted from B+ reference potential 24 through diode 62 and reactive impedance element 54 to junction 27.

Figure 2:
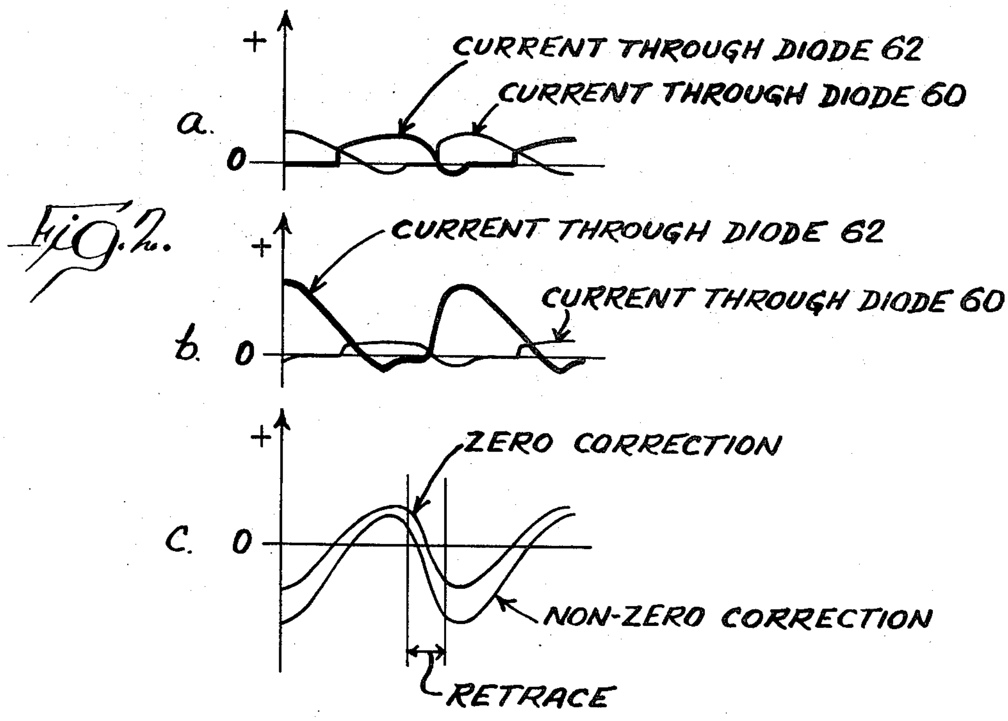
FIG. 2 illustrates representative signal waveforms at different points in the circuit of FIG. 1 for various DC offset conditions.

The respective magnitudes of the two current signals through diodes 60 and 62, are of course, dependent upon the inductance or reactive impedance of the associated coil elements which is determined by the setting of core 56. When the core is at the center position as shown, the core affects coils 52 and 54 equally which, of course, results in an equal amount of current conducted by diodes 60 and 62, since the average voltage across capacitor 34 is equal to the B+ reference potential. A typical comparative wave form of the current signals through diodes 62 and 60 in such a situation is shown in part *a* of FIG. 2 in which the positive direction of current is taken as the direction from anode to cathode of the respective diodes. If core 56 is adjusted to lower the reactive impedance of coil 54 relative to that of coil 52, a greater amount of current would be conducted through diode 62 during the portions of the parabolic voltage signal across capacitor 34 which are below B+ reference potential than would be conducted through coil 52 and diode 60 during the portions of the parabolic signal in which the voltage is greater than B+ reference potential. Typical comparative wave forms of the current conducted through diodes 60 and 62 in such a situation is shown in part *b* of FIG. 2. The magnitudes of the two current signals would be the reverse of that shown if the impedance values of coils 52 and 54 were reversed.

Thus, depending upon the position of the core, the impedance to current flowing through the centering circuit in one direction may be made considerably greater or lesser than the impedance to current flowing through the circuit in the opposite direction and the average DC current through the centering circuit may thereby be made positive, negative or zero. Typical wave forms of the total centering circuit current for zero and non-zero correction conditions are shown in part *c* of FIG. 2.

Since the voltage function which results in the centering circuit current is periodic, one would expect that the corresponding DC current change which results in the total deflection current through deflection windings 32 would also be periodic rather than constant. However, it has been discovered that such is not the case but, in fact, the amount of DC offset current for a particular setting of core 56 is substantially constant. It is believed that the S-shaping capacitor together with the filter capacitance 26 associated with the B+ reference potential affects sufficient filtering to produce the constant DC current offset in the deflection coil.

I claim:

1. In a deflection circuit for a cathode ray tube having a source of reference potential and a deflection coil with one side thereof receiving a deflection signal and another side thereof being serially coupled with a capacitor, a centering circuit for providing a DC offset to the deflection coil, comprising:

reactive impedance means coupled through conduction means between said source of reference potential and said other side of the deflection coil for providing a DC offset current through said deflection coil; and means for varying the reactive impedance of said reactive impedance means to alter said DC offset current.

2. The centering current of claim 1 in which said reactive impedance means comprises inductor means.

3. The centering current of claim 1 in which said reactive impedance means conducts offset current between said source of reference potential and said capacitor.

4. The centering current of claim 3 in which said deflection signal produces across said capacitor, a periodic voltage signal having first and second portions, and said conduction means includes means for conducting current of one polarity through said reactive impedance means during one of the first and second portions of the periodic voltage signal and for conducting current at a second polarity opposite to said first polarity during the other of said first and second portions.

5. The centering current of claim 4 in which said impedance varying means includes means for varying the impedance of said reactive impedance means to selectively conduct a current of greater magnitude during one of said first and second portions than during the other of said first and second portions.

6. The centering circuit of claim 4 in which said conduction means includes a pair of reactive impedance elements comprising said reactive impedance means and both coupled at one end to said another side of said deflection coil, a first rectifying means coupled between the remaining end of one of said pair of rectifying means and said source of reference potential to conduct current therebetween during one of said first and second portions of the periodic voltage signal, and a second rectifying means poled oppositely with respect to said first rectifying means coupled between the remaining end of the other one of said pair of reactive impedance elements and said source of reference potential to conduct current therebetween during the other of said first and second portions of the periodic signal.

7. The centering circuit of claim 6 in which said impedance varying means includes means for varying by different amounts the impedances of each of said pair of reactive impedance elements.

8. The centering unit of claim 7 in which the variation of impedance of one of the reactive impedance elements is indirectly related to the variation of impedance of the other of the reactive impedance elements.

9. The centering circuit of claim 8 in which said reactive impedance elements comprise inductance coils wound about a common bobbin and said impedance varying means comprises a single manually movable core for simultaneously varying the inductance of both inductance coils.

* * * * *